United States Patent
Rajagopal et al.

(10) Patent No.: US 11,556,358 B2
(45) Date of Patent: Jan. 17, 2023

(54) PERSONALIZED VIRTUAL LOBBY IN A MEETING APPLICATION

(71) Applicant: Microsoft Technology Licensing, LLC, Redmond, WA (US)

(72) Inventors: Sukanya Rajagopal, Prague (CZ); Mahesh Pasupuleti, Union City, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/186,178

(22) Filed: Feb. 26, 2021

(65) Prior Publication Data

US 2022/0276879 A1    Sep. 1, 2022

(51) Int. Cl.
| | |
|---|---|
| *G06F 9/451* | (2018.01) |
| *G06F 16/9535* | (2019.01) |
| *G06F 16/9537* | (2019.01) |
| *G06F 16/29* | (2019.01) |
| *G06F 3/14* | (2006.01) |
| *G06Q 30/02* | (2012.01) |
| *H04L 65/403* | (2022.01) |

(52) U.S. Cl.
CPC ............ *G06F 9/451* (2018.02); *G06F 3/1454* (2013.01); *G06F 16/29* (2019.01); *G06F 16/9535* (2019.01); *G06F 16/9537* (2019.01); *G06Q 30/0271* (2013.01); *H04L 65/403* (2013.01)

(58) Field of Classification Search
CPC .... G06F 9/451; G06F 3/1454; G06F 16/9535; G06F 16/9537; G06Q 30/0271
See application file for complete search history.

(56) References Cited

U.S. PATENT DOCUMENTS

| | | | |
|---|---|---|---|
| 7,398,295 B2 | 7/2008 | Shoroff et al. | |
| 8,234,135 B2 | 7/2012 | Herde et al. | |
| 2002/0002586 A1 | 1/2002 | Ratal et al. | |
| 2005/0076014 A1* | 4/2005 | Agarwal | G06Q 30/02 |
| 2007/0208806 A1 | 9/2007 | Mordecai et al. | |
| 2014/0156290 A1 | 6/2014 | Kozicki et al. | |

(Continued)

OTHER PUBLICATIONS

"Host a Virtual Conference, Convention, or Summit", Retrieved From: https://web.archive.org/web/20200426201805/https:/get.bigmarker.com/solutions/web-summits, Apr. 26, 2020, 8 Pages.

(Continued)

*Primary Examiner* — Stella Higgs
(74) *Attorney, Agent, or Firm* — Faegre Drinker Biddle & Reath LLP

(57) ABSTRACT

A pool of virtual lobby applications available for display in a virtual lobby of a meeting application is identified based at least in part on configuration information associated with a meeting being accessed by a user via the meeting application. A set of one or more virtual lobby applications is selected, from among the pool of virtual lobby applications based at least in part on user information associated with the user accessing the meeting via the meeting application, for display to the user in the virtual lobby of the meeting application. The respective virtual lobby applications, among the set of virtual lobby applications, is rendered within a virtual lobby display in a user interface of the meeting application.

20 Claims, 10 Drawing Sheets

(56) References Cited

U.S. PATENT DOCUMENTS

| | | | |
|---|---|---|---|
| 2014/0214504 A1 | 7/2014 | Young et al. | |
| 2014/0333652 A1* | 11/2014 | Walker | G06T 11/001 |
| | | | 345/589 |
| 2016/0234264 A1 | 8/2016 | Coffman et al. | |
| 2019/0272141 A1* | 9/2019 | Poel | G06F 3/1454 |
| 2019/0362312 A1* | 11/2019 | Platt | H04L 65/1069 |
| 2019/0384469 A1 | 12/2019 | Lo et al. | |

OTHER PUBLICATIONS

"Waiting Room", Retrieved From: https://web.archive.org/web/20201208035735/https://support.zoom.us/hc/en-us/articles/115000332726-Waiting-Room, Dec. 8, 2020, 9 Pages.

Tykal, Chloe, "How does Virtual Networking Work", Retrieved From: https://web.archive.org/web/20200803203401/https:/support.accelevents.com/en/articles/3997262-how-does-virtual-networking-work, Aug. 3, 2020, 4 Pages.

"International Search Report and Written Opinion Issued in PCT Application No. PCT/US22/013957", dated May 10, 2022, 11 Pages.

* cited by examiner

PERSONALIZED VIRTUAL LOBBY IN A MEETING APPLICATION

BACKGROUND

Virtual meeting applications are often used by individuals, organizations, etc. for conducting meetings, providing services, etc. In some scenarios, after accessing a meeting via a meeting application, a participant is required to wait until the participant actually joins the meeting in the meeting application. For example, a participant accessing a meeting via a meeting application may be required to wait until a host joins the meeting or until the participant is admitted into the meeting. In typical applications, while a participant is waiting to join the meeting, the participant may be shown a screen that may simply state, for example, that the host has not yet started the meeting or that the participant will soon be let into the meeting.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

In accordance with examples of the present disclosure, a meeting application provides customized and/or personalized virtual lobby displays that may be presented to participants accessing a meeting via the meeting application, for example as participants are waiting to be admitted into, or otherwise join, the meeting via the meeting application. To provide customized and/or personalized virtual lobby content to a participant accessing a meeting via the meeting application, the meeting application may selectively display different virtual lobby applications (e.g., widgets) to the participants within respective virtual lobby displays presented to the participants in their respective meeting applications. In examples, particular virtual lobby applications to be included in a virtual lobby display to a participant accessing a meeting via the meeting application is determined based on both i) meeting configuration information associated with the meeting, configured, for example, by a tenant administrator or an organizer of the meeting and ii) user information associated with the participant accessing the meeting, such as a current geographical location from which the participant is accessing the meeting and/or a time in the geographical location from which the participant is accessing the meeting. In some examples, content displayed within a particular virtual lobby application in a virtual lobby display presented to a meeting participant may be customized and/or personalized for the meeting participant, for example to provide personalized information associated with, and accessible by, the meeting participant. In these ways, a virtual lobby display presented to a participant accessing a meeting via the meeting application may be customized and/or personalized to show relevant information that may be useful to both the organizer of the meeting and the participant accessing the meeting via the meeting application.

In aspects, a system is provided. The system includes one or more computer readable storage media and program instructions stored on the one or more computer readable storage media that, when executed by at least one processor, cause the at least one processor to perform operations. The operations include identifying, based at least in part on configuration information associated with a meeting being accessed by a first user via a first meeting application executing on a first user device, a pool of virtual lobby applications available for display in a virtual lobby of the first meeting application. The operations further include receiving, from the first user device over a network, user information associated with the first user accessing the meeting via the first meeting application and selecting, based at least in part on the user information associated with the first user accessing the meeting via the first meeting application, a first set of one or more virtual lobby applications, from among the pool of virtual lobby applications, for display to the first user in the virtual lobby of the first meeting application. The operations also include causing respective virtual lobby applications, among the first set of virtual lobby applications, to be rendered within a virtual lobby display in a user interface of the first meeting application executing on the first user device.

In further aspects, a method for generating virtual lobbies is provided. The method includes identifying, based at least in part on configuration information associated with a meeting being accessed by a plurality of users via respective meeting applications executing on respective user devices, a pool of virtual lobby applications available for display in virtual lobbies of the respective meeting applications. The method also includes receiving, from at least some of the respective user devices over a network, user information associated with at least some of the users accessing the meeting via the respective meeting applications and, for one or more users among the plurality of users, selecting, based at least in part on the user information associated with the one or more users, a respective set of one or more virtual lobby applications, from among the pool of virtual lobby applications, for display to the one or more user. The method additionally includes causing the respective sets of one or more virtual lobby applications to be rendered in respective virtual lobby displays in respective user interfaces of the respective meeting applications executing on the respective user devices.

In still further aspects, a computer storage medium is provided. The computer storage medium stores computer-executable instructions that when executed by at least one processor cause a computer system to perform operations. The operations include identifying, based at least in part on configuration information associated with a meeting being accessed by a user via a meeting application executing on a user device, a pool of virtual lobby applications available for display in a virtual lobby of the meeting application. The operations also include receiving, from the user device over a network, user information associated with the user accessing the meeting via the meeting application and selecting, based at least in part on the user information associated with the user accessing the meeting via the meeting application, a set of one or more virtual lobby applications, from among the set of virtual lobby applications, for display to the user in the virtual lobby of the meeting application. The operations further include causing respective virtual lobby applications, among the set of virtual lobby applications, to be rendered within a virtual lobby display in a user interface of the meeting application executing on the user device.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects disclosed herein may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In accordance with examples of the present disclosure, a meeting application provides customized and/or personalized virtual lobby displays that may be presented to participants accessing a meeting via the meeting application, for example as participants are waiting to be admitted into, or otherwise join, the meeting via the meeting application. To provide customized and/or personalized virtual lobby content to a participant accessing a meeting via the meeting application, the meeting application may selectively display different virtual lobby applications (e.g., widgets) to the participants within respective virtual lobby displays presented to the participants in their respective meeting applications. In examples, particular virtual lobby applications to be included in a virtual lobby display to a participant accessing a meeting via the meeting application is determined based on both i) meeting configuration information associated with the meeting, configured, for example, by a tenant administrator or an organizer of the meeting and ii) user information associated with the participant accessing the meeting, such as a current geographical location from which the participant is accessing the meeting and/or a time in the geographical location from which the participant is accessing the meeting. In some examples, content displayed within a particular virtual lobby application in a virtual lobby display presented to a meeting participant may be customized and/or personalized for the meeting participant, for example to provide personalized information associated with, and accessible by, the meeting participant. In these ways, a virtual lobby display presented to a participant accessing a meeting via the meeting application may be customized and/or personalized to show relevant information that may be useful to both the organizer of the meeting and the participant accessing the meeting via the meeting application.

Figure 1:
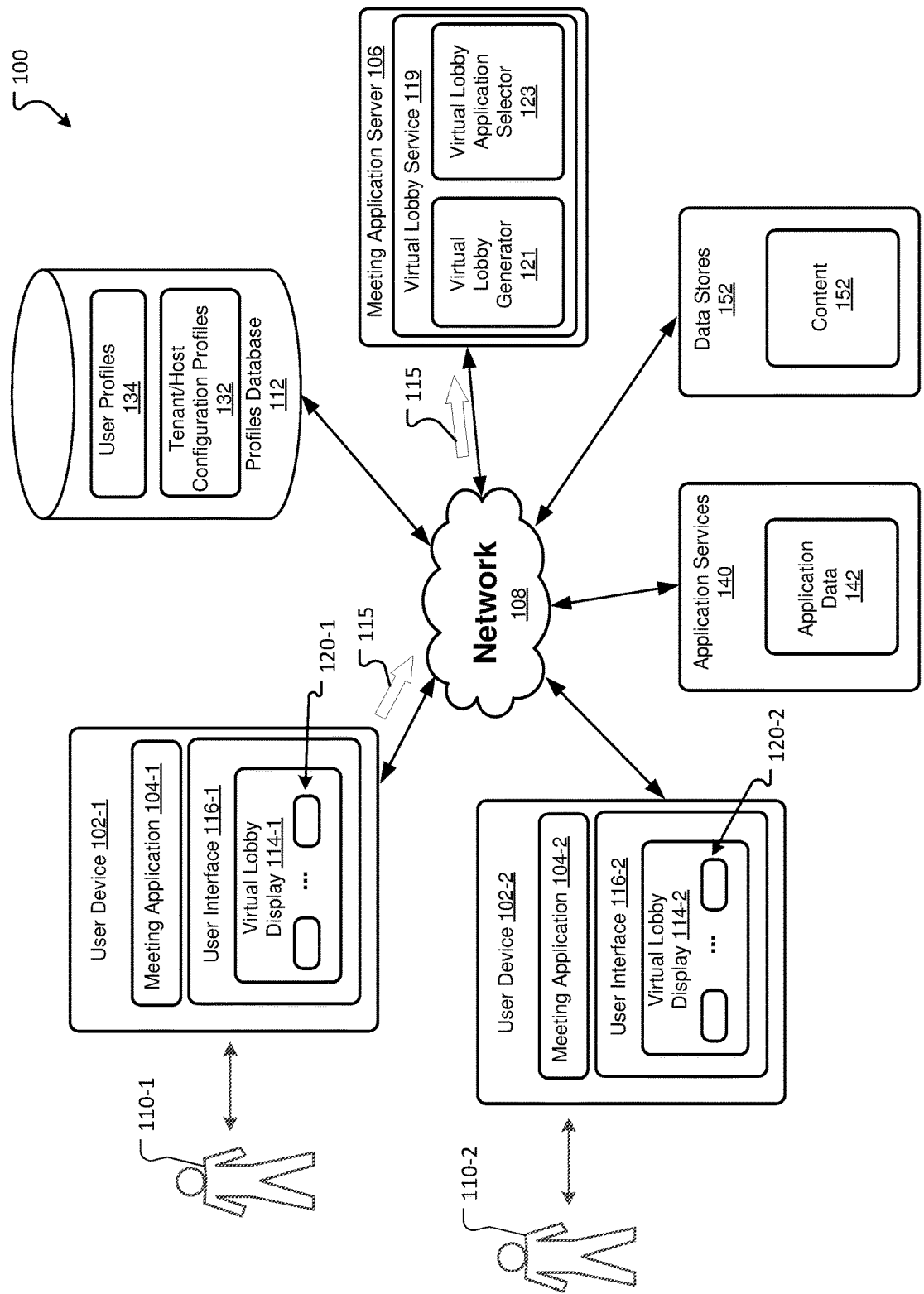
FIG. 1 is a block diagram of a system in which a personalized virtual lobby may be generated and displayed in a user interface of a meeting application, in accordance with an aspects of the present disclosure.

FIG. 1 illustrates an overview of an example system 100 in which a personalized virtual lobby may be rendered in a user interface of a meeting application, in accordance with aspects of the present disclosure. The system 100 may include a plurality of user devices 102 that may be configured to run or otherwise execute client applications 104. The user devices 102 may include, but are not limited to, laptops, tablets, smartphones, and the like. The applications 104 may include applications having meeting features ("meeting applications"), such as video conferencing applications, video chat applications, collaboration applications, and the like. Non-limiting examples of applications 104 include Microsoft™ Teams™, Microsoft™ Skype™, Zoom™, Google™ Hangouts™, Google™ ClassroomT™, and Cisco™ WebEx™. In some examples, the applications 104 may include web applications, where such applications 104 may run or otherwise execute instructions within web browsers. In some examples, the applications 104 may additionally or alternatively include native client applications residing on the user devices 102.

The user devices 102 may be communicatively coupled to a meeting application server 106 via a network 108. The network 108 may be a wide area network (WAN) such as the Internet, a local area network (LAN), or any other suit able type of network. The network 108 may be single network or may be made up of multiple different networks, in some examples. The meeting applications may allow users 110 to access various meetings, such as corporate meetings, conferences, virtual doctor visits, client meetings and the like that may be hosted on the meeting application server 106, for example. When users 110 access meetings via the meeting applications 104, virtual lobby displays 114 may be displayed to the users in user interfaces 116 of the meeting applications 104. A virtual lobby display 114 may be presented to a user 110 after the user 110 accesses a meeting via a meeting application 104 and before the user 110 actually joins the meeting in the meeting application 104, for example as the user 110 is waiting to be admitted into the meeting and/or may be presented to the user 110 at any other suitable time before, during and/or after the meeting. The virtual lobby display 114 may include a set of one or more virtual lobby applications 120 that may provide customized and/or personalized virtual lobby content to the user 110. The virtual lobby applications 120 may include various widgets, for example, and/or may include any other suitable types of applications. Examples of virtual lobby applications 120 include, but are not limited to, productivity applications displaying information (e.g., corporate information) about or related to a company or organization associated with the meeting, video applications displaying informational videos relevant to the meeting, meeting notes applications displaying relevant meeting notes (e.g., relevant notes from a previous meeting), applications displaying current time, current weather, advertisements, etc. The virtual lobby applications 120 may include first party applications (e.g., applications created or provided by a company associated with the meeting application), second party applications (e.g., applications created by or provided by a company that is affiliated with the company associated with the meeting application) and/or third party applications (e.g., applications created by or provided by a company not affiliated with the company associated with the meeting application).

In an example, different sets of virtual lobby applications 120 may be displayed to different users 110 accessing a particular meeting via respective meeting applications 104 and/or different information may be rendered within virtual lobby applications displayed to different users 110 accessing a particular meeting via respective meeting applications 104. The particular set of one or more virtual lobby applications 120 rendered in a virtual lobby display 114 presented to a user 110 when the user 110 is accessing a particular meeting may be determined based on meeting configuration information associated with the particular meeting and/or user information associated with the user 110 accessing the particular meeting.

In an example, parameters for determining the particular set of one or more virtual lobby applications 120 rendered in a virtual lobby display 114 to a user 110 may be determined based on one or both of i) configuration information associated with the meeting being accessed by the user 110, as configured, for example, by a tenant administrator or an organizer of the meeting and ii) user information associated with the user 110 accessing the meeting. Configuration information associated with the meeting may include indications of virtual lobby applications that are available for display in virtual lobby displays 114 to users 110 accessing the meeting. Particular virtual lobby applications that are available for display in virtual lobbies displays 114 to users 110 accessing the meeting may be pre-selected or otherwise pre-configured by the tenant administrator or the meeting organizer, for example. In some examples, configuration information may indicate one or more themes that may be configured for rendering the virtual lobby displays to users accessing the meeting. User information associated with the user 110 accessing the meeting may include a current geographical location and/or current time of day from which the meeting user 110 is accessing the meeting.

Thus, for example, a set of one or more virtual lobby applications 120-1 displayed to the user 110-1 accessing a meeting via the meeting application 104-1 may be different from a set of one or more virtual lobby applications 120-2 (e.g., may include one or more virtual lobby applications 120 not included in the set of virtual lobby applications 120-2) displayed to the user 110-2 accessing the same meeting via the meeting application 104-2, in an example. As a more specific example, if the time of day in a geographical location from which the user 110-1 is accessing the meeting is earlier in the day (e.g., morning) while the time of day in the geographical location from which the user 110-2 is accessing the meeting is later in the day (e.g., evening), then a weather widget may be rendered in the virtual lobby display 114-1 to the user 110-1 and not be rendered in the virtual lobby 114-2 to the user 110-2 because weather forecast may less relevant or useful at the later time of day to the user 110-2. Instead, a different widget or a relevant advertisement may be rendered in the virtual lobby 114-2 to the user 110-2 in place of the weather widget, for example.

As another example, a set of one or more virtual lobby applications 120-1 presented to the user 110-1 when the user 110-1 is accessing a particular meeting via the meeting application 104-1 may be different from a set of one or more applications 120-1 presented to the same user 110-1 when the user 110-1 is accessing a different meeting via the meeting application 104-1. As a more specific example, when the user 110-1 utilizes the meeting application 104-1 as a patient to access a virtual appointment with a doctor, the one or more particular virtual lobby applications 120-1 rendered in the virtual lobby display 114-1 may include applications displaying information about the doctor, such as credentials of the doctor and/or the office of the doctor, information about the patient's medical condition or a reason for the doctor visit, historical information about the patient, advertisements (e.g., for medications) related to the medical condition of the patent and the like. On the other hand, when the user 110-1 utilizes the meeting application 104-1 as an employee or a client of an enterprise organization, then the one or more particular virtual lobby applications 120 presented to the user 110-1 may include applications displaying information about the enterprise and/or information related to the specific meeting, such as relevant notes from a previous meeting, for example. In some examples, content rendered within a particular virtual lobby application 120 in a virtual lobby display 114 presented to a user 110 may be customized and/or personalized for the user 110, for example to provide personal information that may be available for, and accessible, by the user 110. Thus, for example, content (e.g., meeting notes, medical history, prescriptions, recommendations, etc.) rendered to the user 110-1 within a virtual lobby application 120 in the virtual lobby display 114-1 may be different from content rendered to the user 110-2 within the virtual lobby application 120 in the virtual lobby display 114-1.

In some examples, display of personal information (e.g., medical information, health information, personal notes, etc.) in virtual lobby displays 114 of the meeting applications 104 may be controlled or otherwise configured by the users 110. For example, a user 110-1 (e.g., the user 110-1) may be able and/or required (e.g., via the meeting application 104-1) to opt-in or otherwise allow display of personal information in the virtual lobby display 114 of the meeting application and/or to opt-out or otherwise disable display of personal information in the virtual lobby display 114 of the meeting application.

In some aspects, for particular meetings, such as meetings associated with a particular tenant or meeting organizer, one or more of the virtual lobby applications 120 are required to be included in multiple virtual lobby displays 114 (e.g., a subset of the virtual lobby displays 114, all of the of the virtual lobby displays 114, etc.) presented to users 110 accessing the particular meeting, for example to display information that the meeting organizer wishes to present to the multiple users 110 (e.g., a subset of the users 110, all of the users 110, etc.) accessing the particular meetings. On the other hand, one or more other virtual lobby applications 120 are selectively displayed to users, such that different virtual lobby applications 120 may be surfaced to different users. In some aspects, a virtual lobby display 114 displayed to a user 110 may be dynamically updated, for example to display different content within a particular virtual lobby application 120, to remove one or more of the virtual lobby applications 120 and/or to render one or more additional virtual lobby applications 120 in the virtual lobby display 114. Such dynamic update may be performed based on interaction of the user 110 with a virtual lobby application 120 that may be initially displayed in the virtual lobby display 114 to the user 110. As an example, a virtual lobby application 120 initially displayed in the virtual lobby display 114 may be a questionnaire or other type of application that may ask the user 110 to enter or otherwise provide information, such as, for example, information indicative of user preferences or interests, and the virtual lobby display 114 may be updated based on the user input, for example to render different content that may be of interest to the user 110 in one or more of the virtual lobby applications 120, to remove one or more virtual lobby applications 120 that may be determined to have less relevance for the user 110 and/or to display one or more additional virtual lobby application 120 that may be determined to be of greater interest to the user 110.

In some aspects, at least some of the virtual lobby applications 120 displayed to a user 110 may be advertisements or sponsored applications, where a meeting organizer may be monetarily compensated for displaying such advertisements or sponsored applications to the user 110. In some aspects, virtual lobby applications 120 may be customized and/or personalized for some users 110 accessing a meeting and not customized and/or personalized for other users 110 accessing the meeting. For example, a default virtual lobby display, which may include one or more default virtual lobby applications, to users 110 that may be accessing the meeting as guests without providing user identification information.

With continued reference to FIG. 1, the system 100 may include a profiles database 112. The profiles database 112 may be communicatively coupled to the meeting application server 106 and/or to the one or more user devices 102 via the network 108, as illustrated in FIG. 1, or may be coupled to the meeting application server 106 and/or to the one or more user devices 102 in other suitable manners. For example, the profiles database 112 may be directly connected to the meeting application server 106, or may be included as part of the meeting application server 106, in some examples. The profiles database 112 may be a single database or may include multiple different databases.

The profiles database 112 may store tenant/meeting configuration profiles 132 and user profiles 134. The tenant/meeting configuration profiles 132 may include meeting configuration information associated with tenant organizations, meeting organizers, particular meetings, etc. that may specify settings and parameters for generating virtual lobby displays 114 for users accessing meetings via the meeting applications 104. In an example, tenant/meeting configuration profiles 132 may identify pools of virtual lobby applications that are available for display in virtual lobbies to users accessing particular meetings, such as meetings originating from particular tenants or organizations. The pools of virtual lobby applications available for display to users accessing particular meetings may be pre-selected or otherwise pre-configured (e.g., via an administrator portal) by tenant administrators, meeting organizers, or other individuals that may be involved with configuring meeting settings for users or organizations. The pools of virtual lobby applications may be selected from a general pool of all applications that are generally supported and available for installation in the meeting applications 104. In an example, the tenant/meeting configuration profiles 132 may include multiple profiles, for example associated with different groups of people that may be accessing different meetings via the meeting applications 104. For example, a tenant administrator or other individual may configure a first meeting profile 132 for a first group of users, such as users associated with a first client organization and may configure a second meeting profile 132, that may be different from the meeting profile 132, for a second group of users, such as users associated with a different client organization.

The user settings profiles 112 may include respective profiles associated with respective users 110, and may store user preferences and/or other configuration information associated with users 110. For example, the user settings profiles 112 may include configuration information specifying a theme for displaying meetings via the user's meeting application 104.

In an example aspect, when a user 110 (e.g., the user 110-1) accesses a meeting via a meeting application 104 (e.g., the meeting application 104-1), the meeting application 104-1 may generate a virtual lobby request 115 and may transmit the virtual lobby request 115 via the network 108 to the meeting application server 106. The virtual lobby request 115 may include information about the user 110 and/or information about the meeting being accessed by the user 110. For example, the virtual lobby request 115 may include meeting identification information, such as one or more of i) a meeting identifier identifying the meeting, ii) a tenant identifier identifying a tenant that originated the meeting, iii) a user identifier of a user that originated the meeting, etc. As another example, the virtual lobby request 115 may include user information such as one or more of i) a user identifier (e.g., user ID) associated the user 110-1 accessing the meeting, ii) an indicator of a geographical location from which the user 110-1 is accessing the meeting, iii) a time of day in the geographical location from which the user 110-1 is accessing the meeting, etc.

The virtual lobby request 115 may be received by a virtual lobby service 119 that may be running or otherwise executing on the meeting application server 106, and may include a virtual lobby generator 121 and a virtual lobby application selector 123. While the virtual lobby generator 121 and the virtual lobby application selector 123 are illustrated as being executed by a meeting application server 106, the virtual lobby generator 121 and/or the virtual lobby application selector 123 may be at least partially executed at a meeting client application 104 and/or at least partially executed at a meeting client application 104. For example, the virtual lobby generator 121 may generate a virtual lobby in a meeting client application 104. Moreover, the virtual lobby application selector 123 may at least partially reside at the meeting client application 104.

The virtual lobby generator 121 may determine, based on identification information included in the virtual lobby request 115, configurations and parameters for generating a virtual lobby for the user 110-1. For example, the virtual lobby generator 121 may obtain, from the profiles database 112, one or more of a meeting profile, a tenant profile, a meeting originator profile etc. that may include meeting configuration information to be used for generating a virtual lobby for the user 110-1. The meeting configuration information may identify a pool of virtual lobby applications that may be available for display to the user 110-1 in the virtual lobby display 114-1 to the user 110-1. The pool of virtual lobby applications may be pre-configured by a tenant administrator or a meeting organizer as described above, for example. The meeting configuration information may additionally include other information, such as one or more specific parameters for selection of particular virtual lobby applications from the pool of available virtual lobby applications. As another example, the meeting configuration information may indicate one or more themes that may be used for generating the virtual lobby display 114-1 for display to the user 110-1.

The identified pool of virtual lobby applications may be provided to the virtual lobby application selector 123 which may select, based at least in part on user information associated with the user 110-1, a set of one or more virtual lobby applications 120-1, from among the pool of available virtual lobby applications, for display in the virtual lobby display 114-1 to the user 110-1. The virtual lobby application selector 123 may select the set of one or more virtual lobby applications 120-1 based on one or more selection parameters, such as the geographical location from which the user 110-1 is accessing the meeting and/or the time of day in the geographical location from which the user 110-1 is accessing the meeting. Additionally or alternatively, the virtual lobby application selector 123 may utilize one or more other selection parameters that may be indicated, for example, in the meeting configuration information obtained from the database 112.

In an example, the virtual lobby application selector 123 may implement a machine learning algorithm to select the set of one or more virtual lobby applications 120-1 based on the one or more selection parameters. For example, the virtual lobby application selector 123 may implement a ranking algorithm to rank the virtual lobby applications in the pool of available virtual lobby applications based on the one or more selection parameters. The virtual lobby application selector 123 may then select one or more of the highest ranked virtual lobby applications to be included in the set of virtual lobby applications 120-1 to be displayed to the user 110-1. The machine learning algorithm may comprise a community trained model and/or may be refined specifically for the user 110-1 based on feedback that may be received from the user 110-1. The machine learning model may be personalized to the user 110-1, and may be refined and/or improved over time based on usage of the meeting application 104 by the user 110-1 and/or based on other refinement criteria, for example.

Indications of the selected one or more virtual lobby applications in the set of virtual lobby applications 120-1 may be provided to the virtual lobby generator 121. The virtual lobby generator 121 may generate a virtual lobby for the user 110-1, which may, for example, be in the form of a virtual lobby application configured to render the virtual lobby display 114-1, and to render the virtual lobby applications 120-1 within the virtual lobby display 114-1. In an example, the virtual lobby generator 121 may initialize each of the one or more selected virtual lobby applications and may provide necessary user information, such as user identification and/or settings information associated with the user 110-1, to the one or more selected virtual lobby applications. Each of the one or more selected virtual lobby applications 120-1 may then access a corresponding application service among the application services 140, which may be, for example, a first party service, a second party service or a third party service, to obtain application data 142 for rendering the virtual lobby application to the user 110-1. In some examples, data for rendering the one or more of the virtual lobby applications 120-1 may be cached at the meeting application server 106 and/or locally at the user device 102-1. In such examples, the virtual lobby generator 121 need not obtain the application data from the application services 140.

Rendering at least some of the selected virtual lobby applications 120-1 may include accessing one or more data stores 152 (e.g., via the network 108) to obtain content to be rendered within the virtual lobby applications. In some examples, such content may include personalized information that may be accessed in a data store 152 based on the user identifier associated with the user 110-1 and/or may include meeting information (e.g., corporate information and the like) that may be accessed in a data store 152 based on one or more of a meeting identifier identifying the meeting and/or a tenant identifier identifying a tenant that originated the meeting.

In an example, the virtual lobby generator 121 may determine a theme for generating the virtual lobby display 114-1, and may configure the virtual lobby display 114-1 according to the determined theme. The virtual lobby generator 121 may determine the theme based on an indication of the theme (or theme parameters) in the meeting configuration information obtained from the profiles database 112, or may select a theme from multiple possible themes that may be indicated in the meeting configuration information obtained from the profiles database 112, for example. The virtual lobby generator 121 may select the theme from the multiple possible themes, and/or may adjust an indicated or a selected theme, based on a current time of day in the geographical location of the user 110-1, for example. As an example, a darker theme may be used to generate the virtual lobby display 114-1 if the current time of day is later in the day (e.g., evening) and a brighter theme may be used to generate the virtual lobby display 114-1 if the current time of day is earlier in the day (e.g., morning). In some aspects, the virtual lobby generator 121 may also obtain, based on user identification information included in the virtual lobby request 115, user settings from an associated user profile 134 in the profiles database 112. The user settings obtained from the associated user profile 134 may indicate user preferences and/or other configuration information, such as a theme that may be preferred by the user 110-1. In this case, the virtual lobby generator 121 may determine the theme for generating the virtual lobby display 114-1 at least partly based on the theme that may be preferred by the user 110-1.

Figure 2:
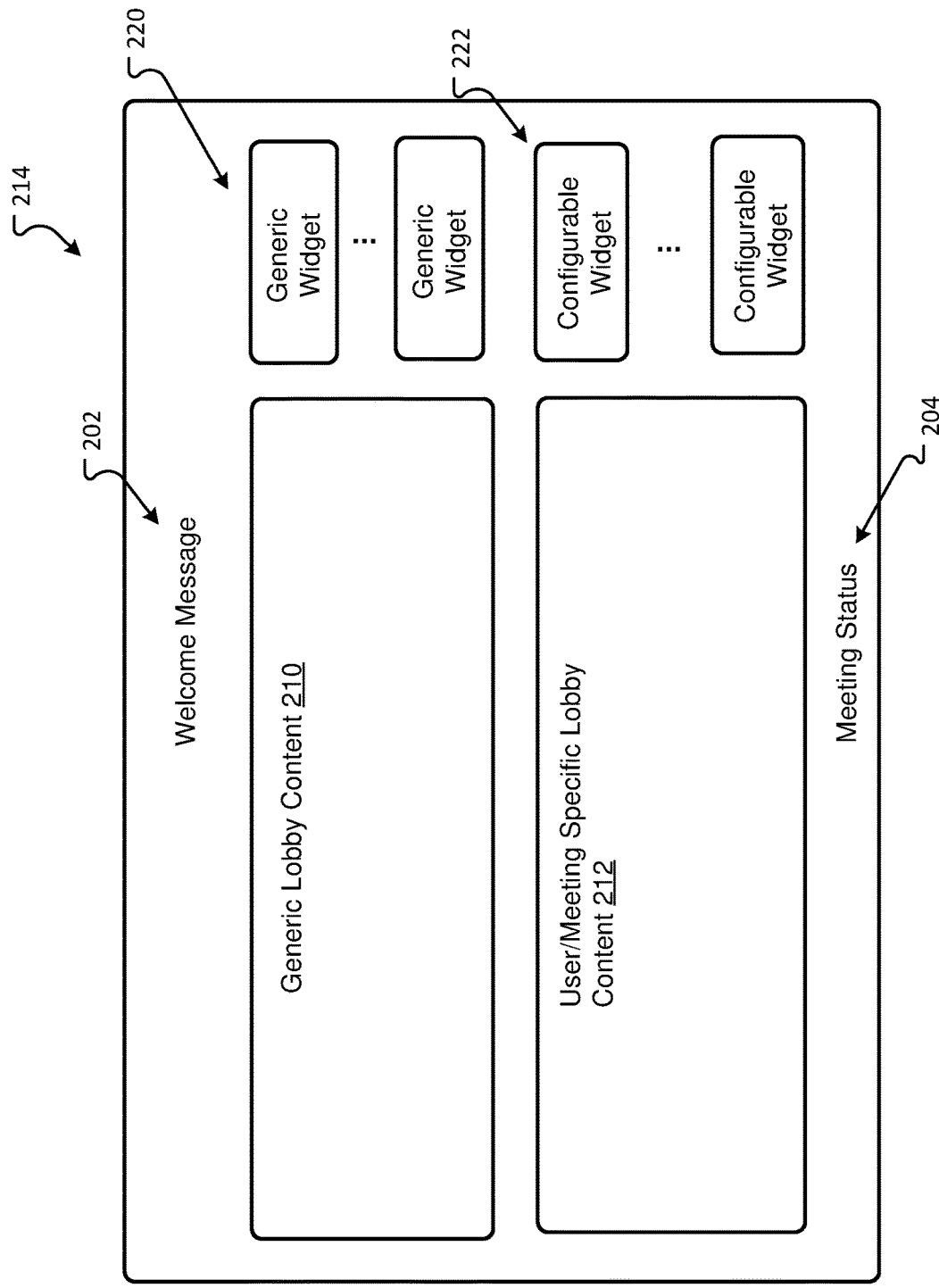
FIG. 2 depicts an example of a personalized virtual lobby that may be displayed in a user interface of a meeting application, in accordance with aspects of the present disclosure.

FIG. 2 depicts an example of a virtual lobby display 214, in accordance with aspects of the present disclosure. In an example, the virtual lobby display 214 corresponds to the virtual lobbies 114 of FIG. 1. For ease of explanation, the virtual lobby display 214 is described with reference to FIG. 1. In another example, the virtual lobby display 214 may be utilized in a system different from the system 100 of FIG. 1.

The virtual lobby display 214 is generated for a user 110 accessing a meeting (e.g., a corporate meeting, a client meeting, a virtual doctor's visit, etc.) via a meeting applications 104 of FIG. 1, in an example. The virtual lobby display 214 may include a welcome message area 202 that may display a welcome message, or may display other meeting information, such as a meeting title, identity of a meeting organizer or organizing organization, etc. The virtual lobby display 214 may also include a meeting status area 204 that may display a current status of the meeting, such as a message indicating that the user will soon be admitted to the meeting, etc., or other status information about the meeting, such as a time at which the meeting will begin. A generic content area 210 may include a display of generic information that may be shared among multiple users 110 accessing a meeting, or shared among users 110 accessing any meeting originated from a particular meeting organizer or tenant, for example. The generic content may be obtained from a data store 152 based on an identifier of a meeting organizer or a tenant that originated the meeting, and may rendered within one or more virtual lobby applications 120 that are required to be displayed to the multiple users 110 accessing the meeting. For example, in an aspect in which the meeting is a corporate meeting or an educational meeting, the generic content area 212 may display information about the particular corporation or the particular educational organization to every user accessing any meeting originated from the corporation or educational organization.

A user/meeting specific lobby content area 212 may include content that may be personalized to users accessing a meeting. For example, in an example in which the meeting is a corporate meeting, the user/meeting specific lobby content area 212 may include user's personal notes from a previous meeting. As another example, in an example in which the meeting is a virtual doctor's visit, the user/meeting specific lobby content area 212 may include user's medical history or prescription information.

The virtual lobby display 214 may also include one or more generic widgets 220 and one or more configurable widgets 220. The one or more generic widgets 220 may include widgets or other applications that may be presented in virtual lobby displays 114 to multiple users 110 accessing a meeting, or to multiple users 110 accessing any meeting originated from the particular meeting organizer or tenant, for example. The one or more generic widgets 220 may include a current time widget, a current weather widget, etc., that the tenant administrator or meeting organizer may wish to display to all users accessing meetings originating from the tenant or the meeting organizer, for example. The one or more configurable widgets 220, on the other hand, may include one or more widgets or other applications that may be selected specifically for the user 110 accessing the meeting. The one or more configurable widgets 220 may provide advertisements or other information that may be relevant and useful to the user 110. The particular number of configurable widgets 220 displayed to the user 110 may depend on amount of space available for the configurable widgets on a screen of a user device 102 being used to access the meeting, for example. The particular one or more configurable widgets 220 to be displayed to the user 110 may be selected by the virtual application selector 123 as discussed above, for example. In other aspects, the one or more configurable widgets 220 to be displayed to the user 110 may be selected in other suitable manners.

Figure 3:
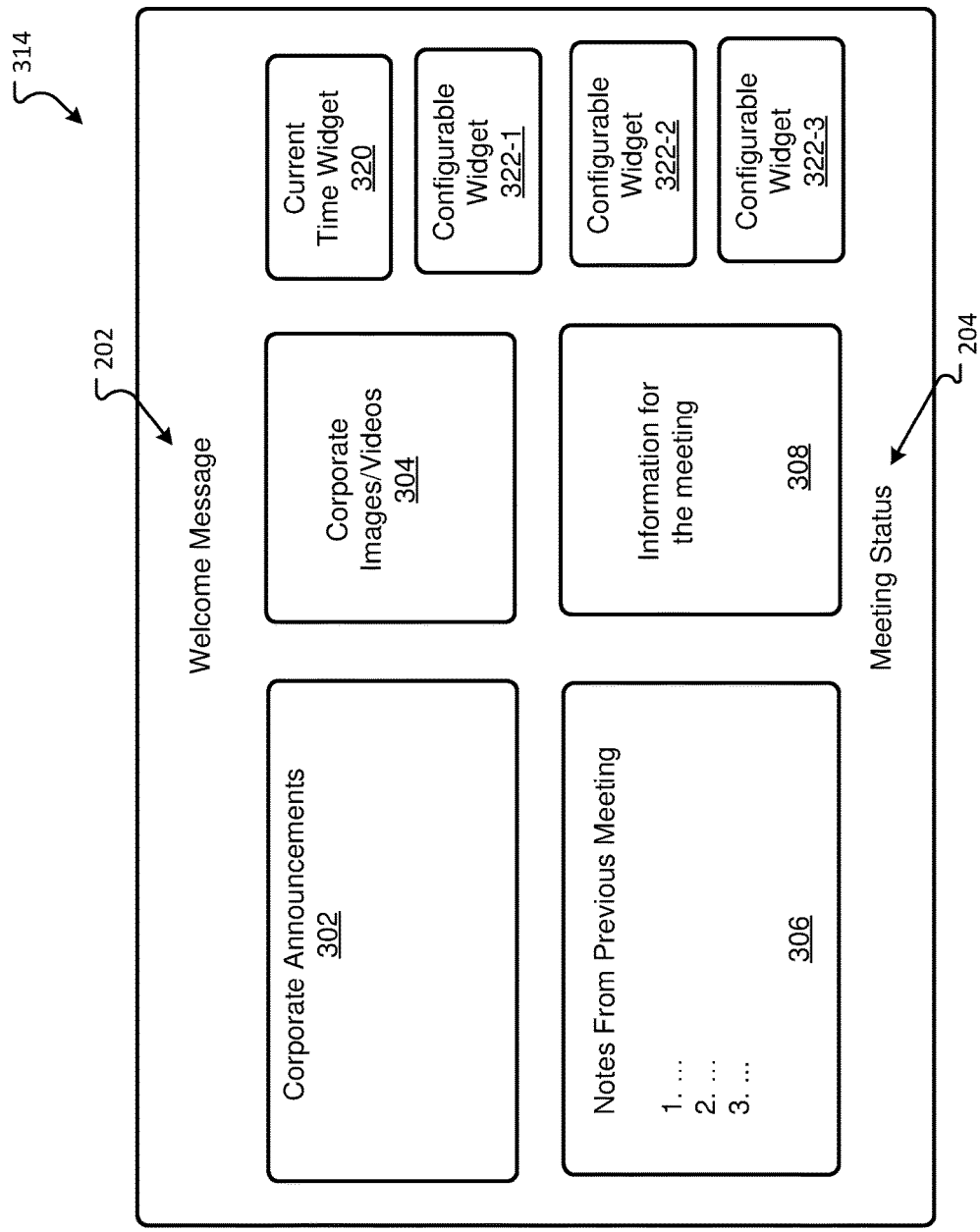
FIG. 3 depicts additional details of a personalized virtual lobby that may be displayed in a user interface of a meeting application, in accordance with aspects of the present disclosure.

FIG. 3 depicts additional non-limiting details of the personalized virtual lobby 314, in accordance with aspects of the present disclosure. In an example, the virtual lobby display 314 corresponds to the virtual lobby displays 114 of FIG. 1. For ease of explanation, the virtual lobby display 314 is described with reference to FIG. 1. In another example, the virtual lobby display 314 may be utilized in a system different from the system 100 of FIG. 1.

The virtual lobby display 314 is generated for a user 110 (e.g., the user 110-1) accessing a corporate meeting via a meeting applications 104 (e.g., the meeting application 104-1) of FIG. 1, in an example. The virtual lobby display 314 may include corporate information, such as corporate announcements 302 and/or corporate images/videos 304, which may be displayed to all users accessing the meeting via respective meeting applications 104. The corporate announcements 302 may provide general information, news, etc. associated with the corporation hosting the meeting. The corporate images/videos 304 may display an image or a video, such as, for example, a company logo or an informational video about the corporation hosting the meeting.

The virtual lobby display 314 may also include meeting-specific information, such as meeting notes 306 and/or information for the meeting 308. The meeting notes 306 may display personal notes of the user 110 from a previous meeting. The personal notes may be retrieved from a data store 152 based on a user ID or other information identifying the user 110, for example. The information for the meeting 308 may include information relevant to the subject of the meeting; such information may be retrieved from a data store 152 based, for example, on a meeting identifier associated with the meeting or based on a subject of the meeting.

In some examples, the virtual lobby service 119 (e.g., the virtual lobby generator 121) that may be executing on the meeting application server 106 may generate a request for retrieving personal information (e.g., personal notes on the like) associated with a user 110, where the request includes a user ID or other information identifying the user 110, and cause the request to be transmitted to the data store 152 (e.g., over the network 108). In response, the requested personal information may be retrieved from a corresponding record in a data store 152 and transmitted (e.g., over the network 108) back to the meeting application server 106, where the personal information may be provided or otherwise made available to the virtual lobby service 119. Similarly, in some examples, the virtual lobby service 119 (e.g., the virtual lobby generator 121) that may be executing on the meeting application server 106 may generate a request for retrieving meeting information (e.g., information relevant to the subject of the meeting), where the request includes a one or more of meeting ID, meeting subject, etc. or other information identifying information relevant to the meeting, cause the request to be transmitted to a data store 152 (e.g., over the network 108), and, in response, may receive the requested information (e.g., over the network 108).

The virtual lobby display 314 may also include one or more generic widgets 320 and one or more configurable widgets 322. The one or more generic widgets 320 may include one or more widgets or other applications that the tenant administrator or meeting organizer may wish to display to all users accessing meetings originating from the tenant or the meeting organizer, for example. As a more specific example, the one or more generic widgets 320 may include a "current time" widget if a tenant administrator wishes to display a current time to all users accessing meetings originating from the tenant. The one or more configurable widgets 322, on the other hand, may include one or more widgets or other applications that may be selected specifically for the user 110 accessing the meeting. The one or more configurable widgets 320 may provide advertisements or other information that may be relevant and useful to the user 110. The particular number of configurable widgets 320 displayed to the user 110 may depend on amount of space available for the configurable widgets on a screen of a user device 102 being used to access the meeting, for example. The particular one or more configurable widgets 320 to be displayed to the user 110 may be selected by the virtual application selector 123 as discussed above, for example. In other aspects, the one or more configurable widgets 320 to be displayed to the user 110 may be selected in other suitable manners.

Figure 4:
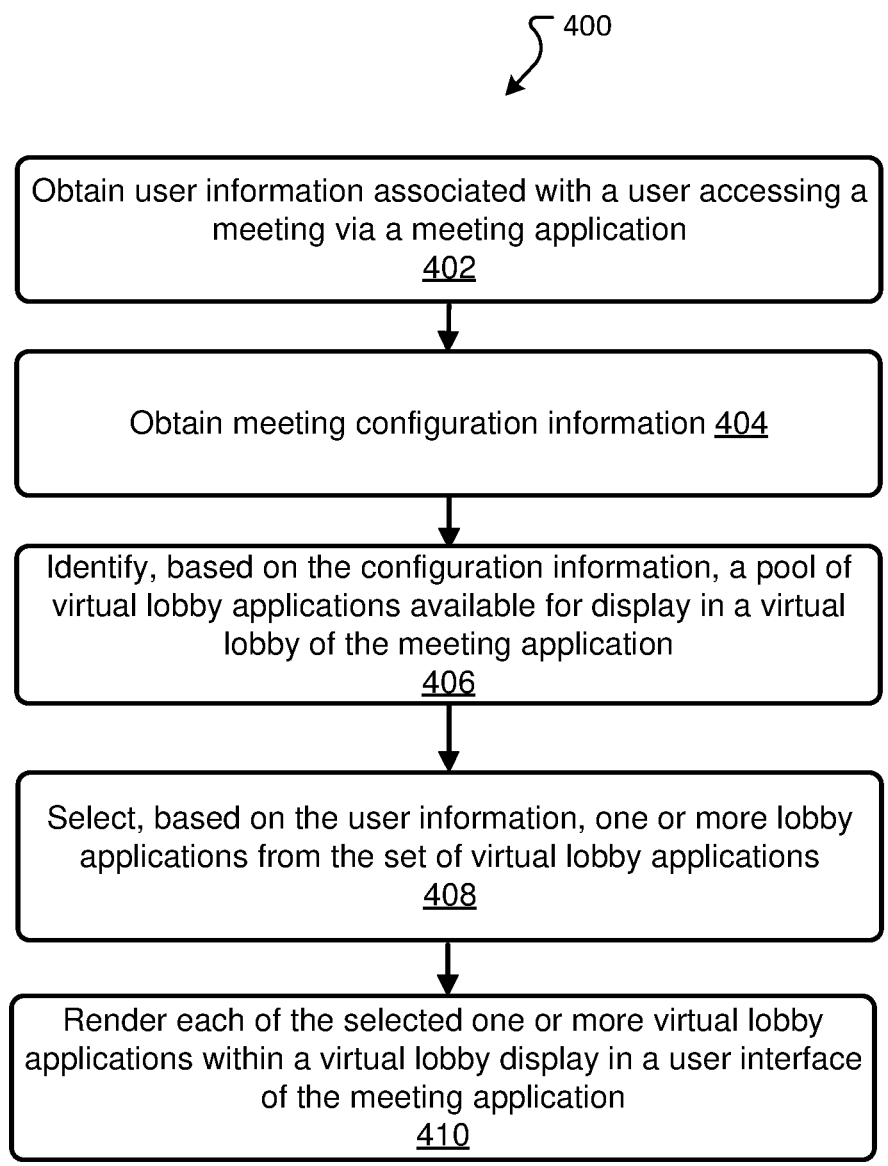
FIG. 4 depicts details of a method for generating a personalized virtual lobby for display in a user interface of a meeting application, in accordance with aspects of the present disclosure.

FIG. 4 depicts details of a method 400 for generating a personalized virtual lobby for display in a user interface of a meeting application, in accordance with aspects of the present disclosure. A general order for the steps of the method 400 is shown in FIG. 4. The method 400 can be executed as a set of computer-executable instructions executed by a computer system and encoded or stored on a computer readable medium. Further, the method 400 can be performed by gates or circuits associated with a processor, Application Specific Integrated Circuit (ASIC), a field programmable gate array (FPGA), a system on chip (SOC), or other hardware device. Hereinafter, the method 400 shall be explained with reference to the systems, components, modules, software, data structures, user interfaces, etc. described in conjunction with FIGS. 1-3.

At block 402, user information associated with a user (e.g., a user 110) accessing a meeting via a meeting application (e.g., a meeting application 104) is obtained. The user information is obtained by the virtual lobby generator 121, for example. In an example, the user information may be received (e.g., over the network 108) from the a user device 102 executing the meeting application. The user information may include a user identifier (ID) and/or other user credentials associated with the user 110. The user ID and/or other user credentials may correspond to the credentials used by the user 110 to log in, or otherwise sign in, to the meeting application 104. The user information may also include a current geographical location of the user 110 and/or a current time of day in the geographical location of user 110. The user ID and/or other information, such as geographical location and/or time of day information may be obtained from a virtual lobby display request (e.g., request 115) that may be received from the meeting application 104. In an example, the time of day in the geographical location of the user may be omitted from the request 115 and may instead be determined by the virtual lobby generator based on the geographical location of the user 110 and the time of receipt of the request. In some examples, the user information may also include user settings that may be obtained by accessing a user profile 134 in the profiles database 112 based on the user ID associated with the user 110, for example. The user settings may include user preferences and other configuration information, such as a display theme indicating text size, background color, etc. In other aspects, other types of user information may additionally or alternatively be obtained at block 402 by the virtual lobby generator 121.

At block 404, meeting configuration information associated with the meeting being accessed is obtained by the virtual lobby generator 121. The meeting configuration information may be obtained by accessing a tenant/meeting profile 132 in the profiles database 112 based on a tenant or a meeting ID associated with the meeting, for example. In an example, meeting configuration information 132 may indicate virtual lobby applications that are available for display in virtual lobbies to users accessing the meeting. The virtual lobby applications available for display to users accessing the meeting may be pre-selected or otherwise pre-determined by a tenant administrator or a meeting organizer, for example. The meeting configuration information may also identify one or more parameters for selecting particular virtual lobby applications, from the pool of virtual lobby applications, to be displayed to users accessing the meeting via meeting applications 104. In some aspects, the meeting configuration information may also include other information, such as information identifying theme parameters for generating virtual lobby displays for display to users accessing the meeting via the meeting applications 104.

At block 406 a pool of virtual lobby applications available for display in a virtual lobby of the meeting application 104 is identified. In an example, the pool of virtual lobby applications is identified based at least in part on the indications of available virtual lobby applications in the meeting configuration information obtained at block 404. At block 408, a set of one or more virtual lobby applications is selected from the pool of virtual lobby applications identified at block 406. The set of one or more virtual lobby applications may be selected based at least in part on the one or more selection parameters indicated in the meeting configuration information obtained at block 404, for example. The set of one or more virtual lobby applications is selected by the virtual lobby application selector 123 as described above, for example. In other aspects, the set of one or more virtual lobby applications is selected in other suitable manners.

At block 410, the one or more virtual lobby applications among the set of virtual lobby applications selected at block 408 are rendered within a virtual lobby display (e.g., virtual lobby display 114). The virtual lobby display may be generated based on a theme indicated in meeting configuration information obtained at block 404 and/or a theme indicated in user settings obtained at block 404. Rendering of the one or more virtual lobby applications at block 410 may include obtaining (e.g., from an application service 140) application data for rendering each of the one or more virtual lobby applications. Rendering of the one or more virtual lobby applications at block 410 may also include obtaining (e.g., from a data store 152) content to be rendered within one or more of the virtual lobby applications, in some examples. Rendering of the virtual lobby applications, according to an example, is described in more detail below in connection with FIG. 5. In other aspects, other suitable methods for rendering the virtual lobby applications are utilized.

Figure 5:
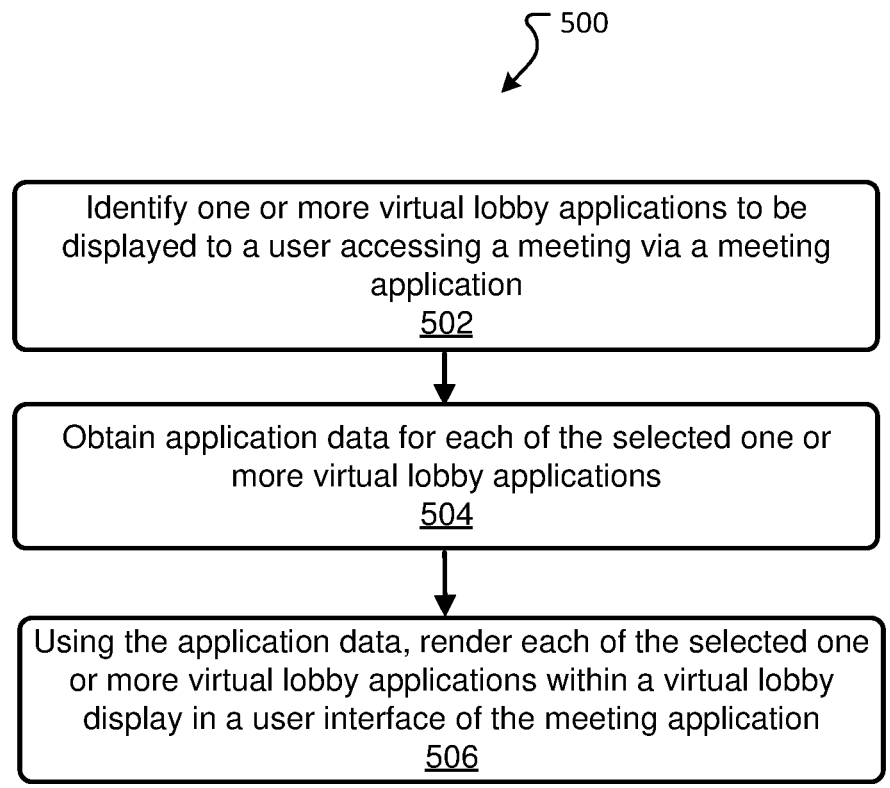
FIG. 5 depicts details of a method for identifying applications to be included in a personalized virtual lobby for display in a user interface of a meeting application, in accordance with aspects of the present disclosure.

FIG. 5 depicts details of a method 500 for identifying applications to be included in a personalized lobby for display in a user interface of a meeting application, in accordance with aspects of the present disclosure. A general order for the steps of the method 500 is shown in FIG. 5. The method 500 can be executed as a set of computer-executable instructions executed by a computer system and encoded or stored on a computer readable medium. Further, the method 500 can be performed by gates or circuits associated with a processor, Application Specific Integrated Circuit (ASIC), a field programmable gate array (FPGA), a system on chip (SOC), or other hardware device. Hereinafter, the method 500 shall be explained with reference to the systems, components, modules, software, data structures, user interfaces, etc. described in conjunction with FIGS. 1-4.

At block 502, a set of one or more virtual lobby applications to be displayed to a user (e.g., a user 110) accessing a meeting via a meeting application (e.g., a meeting application 104) is identified. In an example, the meeting application may be executing on a user device (e.g., the user device 102-1) In an example, the set of one or more virtual lobby applications is selected based at least in part user information associated with the user; such user information may be received (e.g., over the network 108) from the user device 102-1. For example, such user information may be included in a virtual lobby request (e.g., the virtual lobby request 115) that may be received (e.g., over the network 108) from the user device. In an example, the set of one or more lobby applications is selected at block 502 from a pool of available lobby applications by the virtual lobby application selector 123 as described above. In other aspects, the set of one or more virtual lobby applications is selected at block 502 in other suitable manners.

At block 504, data for rendering the one or more virtual lobby applications is obtained. The data for rendering the one or more virtual lobby applications is obtained at the virtual lobby generator 121, for example. To obtain data for rendering each particular application, the virtual lobby generator 121 may provide (e.g., in a request transmitted over the network 108) an indicator of the particular application to an app store or other repository storing available virtual lobby applications. The virtual lobby generator 121 may also provide (e.g., in a request transmitted over the network 108) a user ID associated with the user 110, and/or user settings information associated with the user 110, as needed for the particular application to the app store or other repository. The particular virtual lobby application may access (e.g., over the network 108) an appropriate application service 140 to obtain the data needed for rendering within the virtual lobby application to the user. In some examples, the particular virtual lobby application may access an appropriate data store 150 to obtain content 152 to be rendered for display to the user within the virtual lobby application. In some aspects, data for rendering a particular virtual lobby application (e.g., a frequently selected virtual lobby application) and/or content to be rendered within the particular virtual lobby application may be cached and obtained locally by the virtual lobby generator 121.

At block 506, the applications among the set of lobby applications are rendered based on the application data obtained at block 504. In some examples, each of one or more of the virtual lobby applications may be rendered to display content obtained at block 504 for rendering within the application. In an example, the virtual lobby generator 121 may generate a virtual lobby application for rendering the set of virtual lobby applications based on the application data obtained at block 504, and may provide (e.g., transmit over the network 108) the virtual lobby application to the user device 102 being used by the user for accessing the meeting application 104. The meeting application 104 may then execute the virtual lobby application to render the set of virtual lobby applications within a virtual lobby display 114, and may display the virtual lobby display 114 in the user interface 116 of the meeting application 104.

Figure 6:
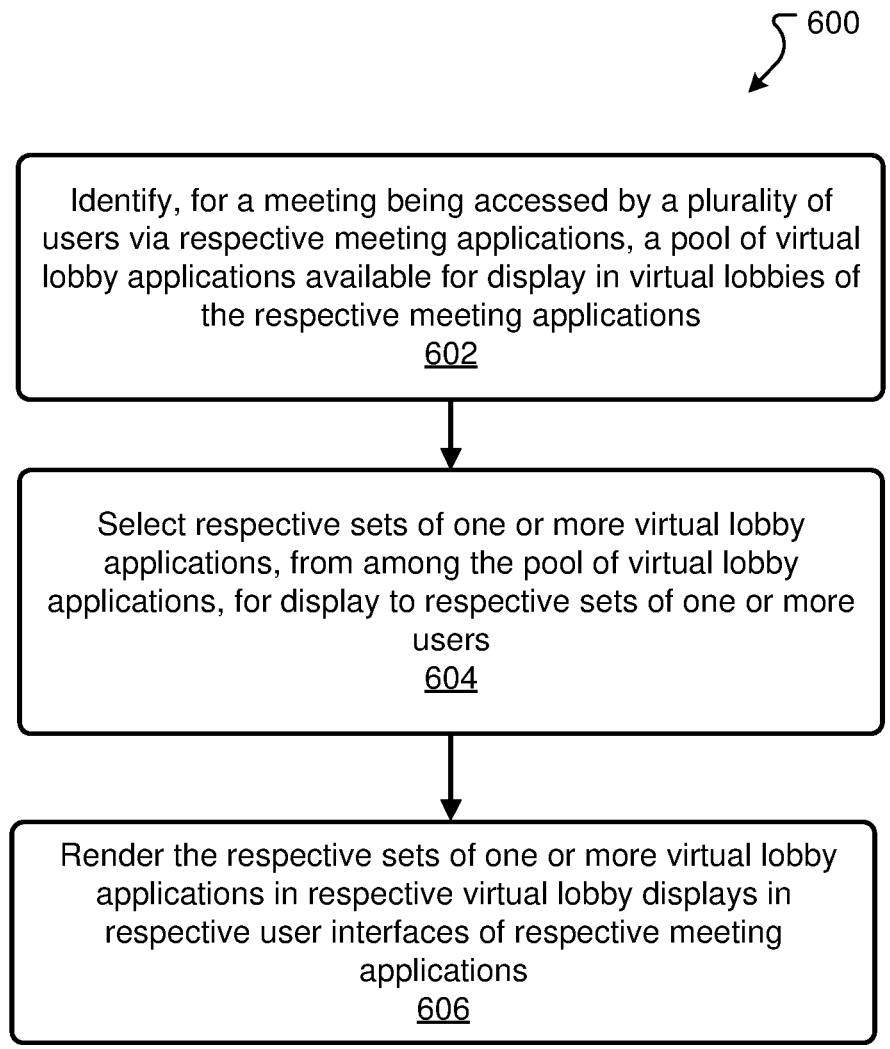
FIG. 6 depicts details of a method for generating virtual lobbies, in accordance with aspects of the present disclosure.

FIG. 6 depicts details of a method 600 for generating personalized virtual lobbies, in accordance with aspects of the present disclosure. A general order for the steps of the method 600 is shown in FIG. 6. The method 600 can be executed as a set of computer-executable instructions executed by a computer system and encoded or stored on a computer readable medium. Further, the method 600 can be performed by gates or circuits associated with a processor, Application Specific Integrated Circuit (ASIC), a field programmable gate array (FPGA), a system on chip (SOC), or other hardware device. Hereinafter, the method 600 shall be explained with reference to the systems, components, modules, software, data structures, user interfaces, etc. described in conjunction with FIGS. 1-5.

At block 602, a pool of virtual lobby applications available for display in virtual lobbies of respective meeting applications (e.g., meeting applications 104) via which a meeting is accessed by a plurality of users (e.g., users 110) is identified. In an example, the pool of virtual lobby applications is identified based at least in part on meeting configuration information associated with the meeting being accessed by the plurality of users via the respective meeting applications. In an example, the pool of virtual lobby applications is identified by the virtual lobby generator 121 as described above. In other aspects, the pool of virtual lobby applications is identified is other suitable manners.

At block 604, a respective set of one or more virtual lobby applications is selected from among the set of virtual lobby applications for display to one or more users. In an example, the set of one or more virtual lobby applications is selected based at least in part user information associated with the one or more users; such user information may be received (e.g., over the network 108) from respective user devices (e.g., user devices 102) executing the respective meeting applications. For example, such user information may be included in respective virtual lobby requests (e.g., respective virtual lobby requests 115) that may be received (e.g., over the network 108) from the respective user devices 102 executing the respective meeting applications. In aspects, the respective set of one or more virtual lobby applications may be selected based on at least in part the one or more selection parameters indicated for the one or more users in the meeting configuration information associated with the meeting. The set of one or more virtual lobby applications is selected by the virtual lobby application selector 123 as described above, for example. In other aspects, the set of one or more virtual lobby applications is selected in other suitable manners.

At block 606, the respective sets of one or more virtual lobby applications are rendered in respective virtual lobby displays in respective user interfaces of the respective meeting applications. Rendering of the one or more virtual lobby applications at block 606 may include obtaining (e.g., from an application service 140) application data for rendering each of the one or more virtual lobby applications. Rendering of the one or more virtual lobby applications at block 606 may also include obtaining (e.g., from a data store 152) content to be rendered within one or more of the virtual lobby applications, in some examples. The content may be obtained for each user, based on a user identifier associated with each user, such that personalized content may be obtained for different users. Rendering of the virtual lobby applications, according to an example, is performed as described above in connection with FIG. 5. In other aspects, other suitable methods for rendering the virtual lobby applications are utilized.

Figure 7:
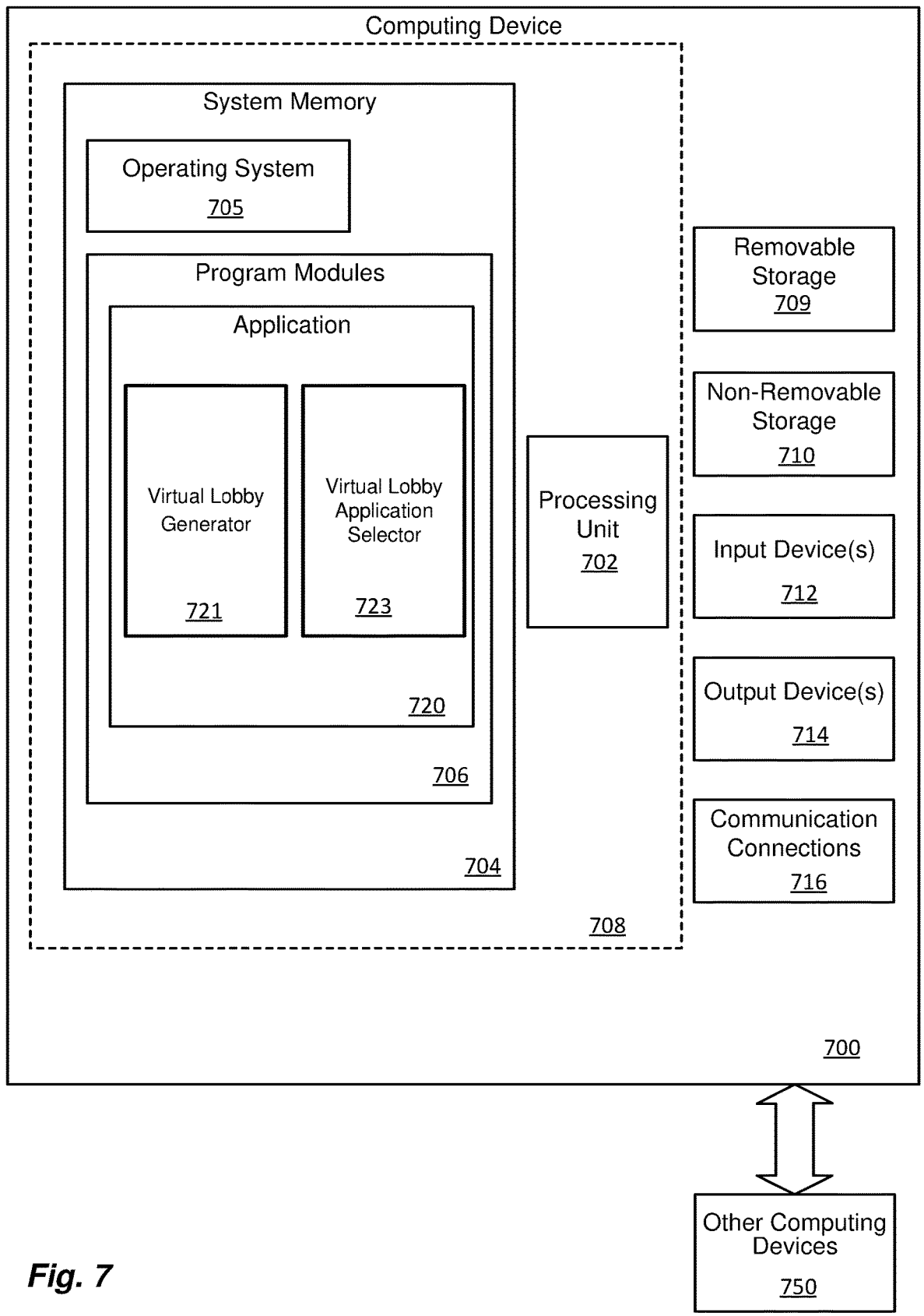
FIG. 7 is a block diagram illustrating physical components (e.g., hardware) of a computing device with which aspects of the disclosure may be practiced.
Figure 8A:
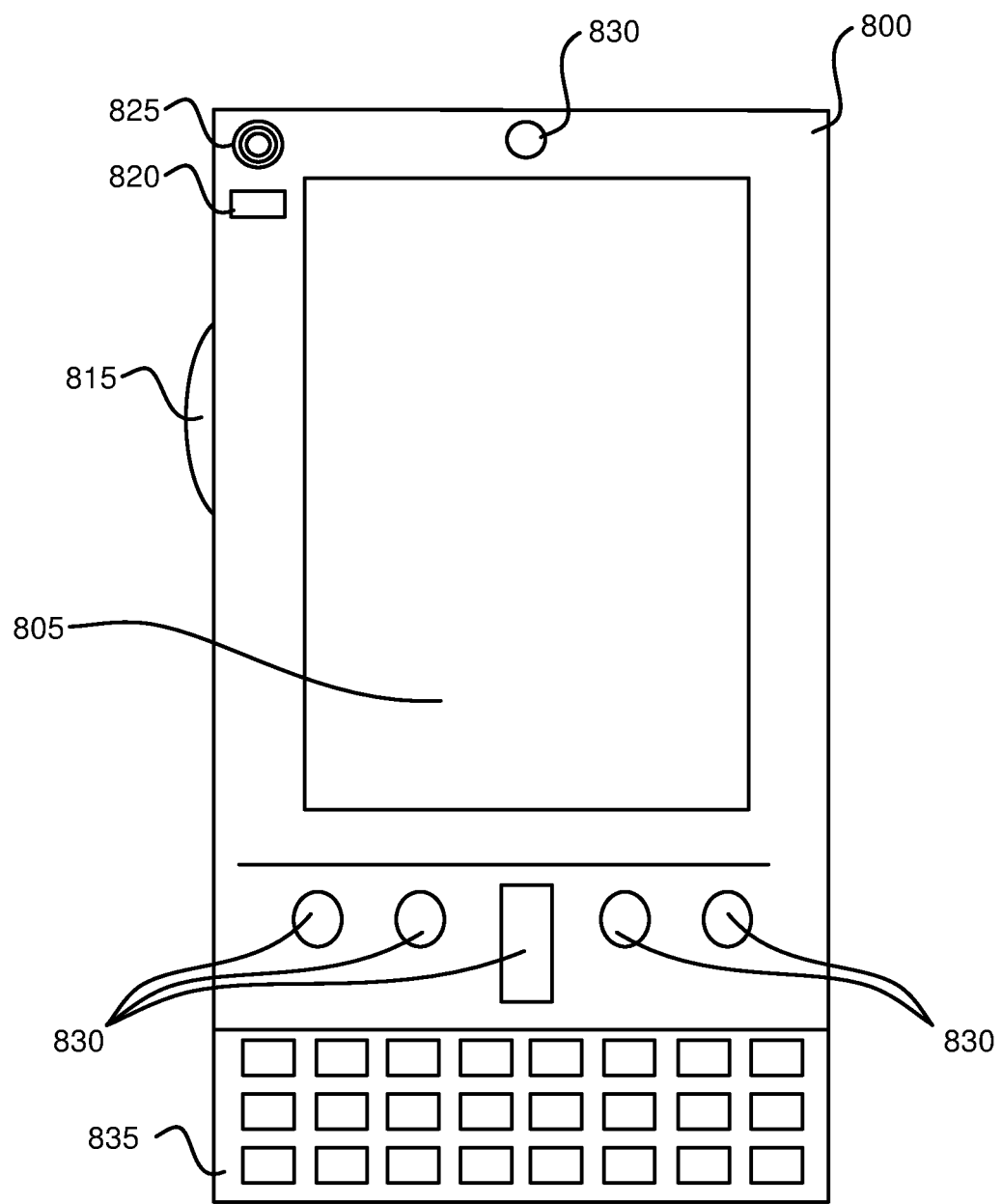
FIGS. 8A-8B illustrate a mobile computing device with which aspects of the disclosure may be practiced.
Figure 8B:
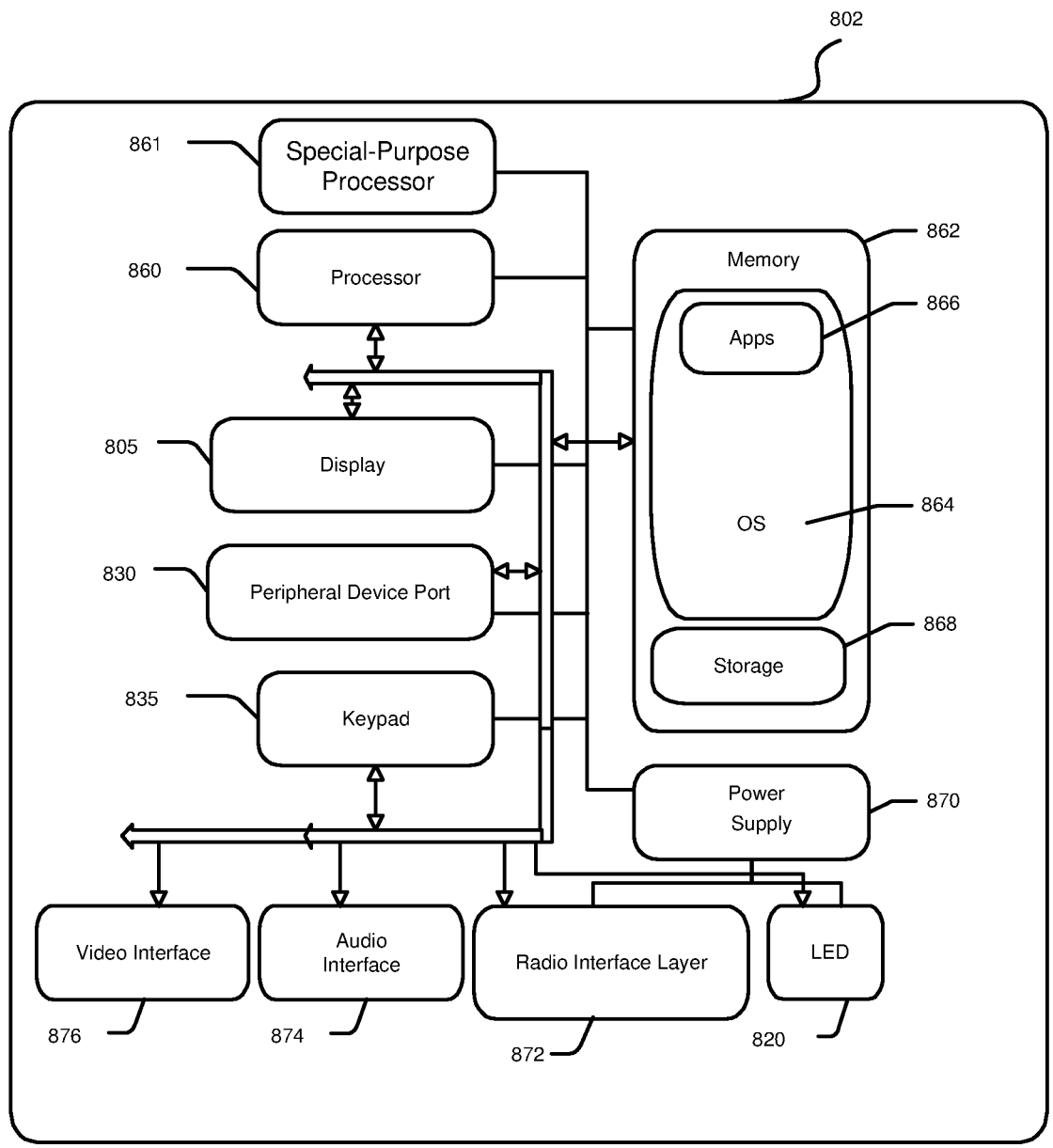
Figure 9:
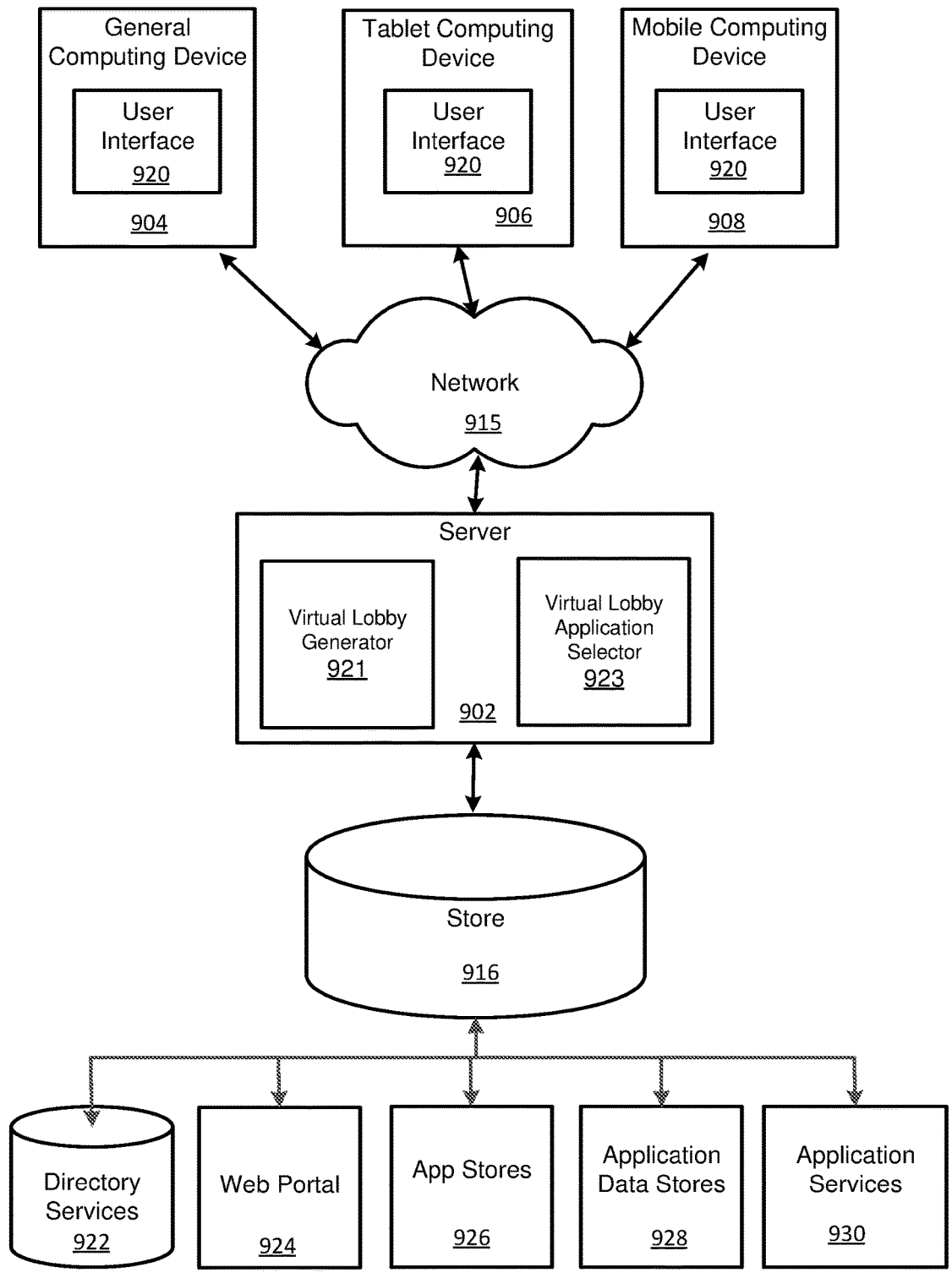
FIG. 9 illustrates an example architecture of a system in which aspects of the disclosure may be practiced.

FIGS. 7-9 and the associated descriptions provide a discussion of a variety of operating environments in which aspects of the disclosure may be practiced. However, the devices and systems illustrated and discussed with respect to FIGS. 7-9 are for purposes of example and illustration and are not limiting of a vast number of computing device configurations that may be utilized for practicing aspects of the disclosure, described herein.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories.

The system memory 704 may include an operating system 705 and one or more program modules 706 suitable for running software application 720, such as one or more components supported by the systems described herein. As examples, system memory 704 may store a virtual lobby generator 721 (e.g., corresponding to the virtual lobby generator 121 of FIG. 1) and/or a virtual lobby application selector 723 (e.g., corresponding to the virtual lobby application selector 123 of FIG. 1). The operating system 705, for example, may be suitable for controlling the operation of the computing device 700.

Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the at least one processing unit 702, the program modules 706 (e.g., application 720) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 8A-8B illustrate a mobile computing device 800, for example, a mobile telephone, a smart phone, wearable computer (such as a smart watch), a tablet computer, a laptop computer, and the like, with which aspects of the disclosure may be practiced. In some aspects, the client (e.g., computing system 104A-E) may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external source.

FIG. 8B is a block diagram illustrating the architecture of one aspect of computing device, a server, or a mobile computing device. That is, the computing device 800 can incorporate a system (e.g., an architecture) 802 to implement some aspects. The system 802 can implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein (e.g., search engine, extractor module, relevancy ranking module, answer scoring module, etc.).

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

FIG. 9 illustrates one aspect of the architecture of a system for processing data received at a computing system from a remote source, such as a personal computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an application data stores 928, or application services 930.

A virtual lobby generator 921 (e.g., corresponding to the virtual lobby generator 121 of FIG. 1) and a virtual lobby application selector 923 (e.g., corresponding to the virtual lobby application selector 123 of FIG. 1) may be employed by a client that communicates with server device 902, and/or the virtual lobby generator 921 and/or the virtual lobby application selector 923 may be employed by server device 902. The server device 902 may provide data to and from a client computing device such as a personal computer 904, a tablet computing device 906 and/or a mobile computing device 908 (e.g., a smart phone) through a network 915. By way of example, the computer system described above may be embodied in a personal computer 904, a tablet computing device 906 and/or a mobile computing device 908 (e.g., a smart phone). Any of these examples of the computing devices may obtain content from the store 916, in addition to receiving graphical data useable to be either pre-processed at a graphic-originating system, or post-processed at a receiving computing system.

FIG. 9 illustrates an exemplary mobile computing device 900 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the present disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
one or more computer readable storage media; and
program instructions stored on the one or more computer readable storage media that, when executed by at least one processor, cause the at least one processor to:
identify, based at least in part on configuration information associated with a meeting being accessed by a first user via a first meeting application executing on a first user device, a pool of virtual lobby applications available for display in a virtual lobby of the first meeting application the configuration information configured by one or both of i) an administrator of the meeting and ii) an organizer of the meeting, the administrator of the meeting and organizer of the meeting not being the first user;
select, based at least in part on the configuration information, a first set of virtual lobby applications, from among the pool of virtual lobby applications identified based at least in part on the configuration information, for display to the first user in the virtual lobby of the first meeting application;
cause respective virtual lobby applications, among the first set of virtual lobby applications, to be rendered within a virtual lobby display in a user interface of the first meeting application executing on the first user device;
receive, from the first user device over a network after causing the respective virtual lobby applications to be rendered, user information associated with the first user accessing the meeting via the first meeting application;
select, based at least in part on the user information associated with the first user accessing the meeting via the first meeting application, a first content of the selected first set of virtual lobby applications, for display to the first user in the virtual lobby of the first meeting application; and
cause respective first content of the virtual lobby applications, among the selected first set of virtual lobby applications, to be rendered within the virtual lobby display in the user interface of the first meeting application executing on the first user device.

2. The system of claim 1, wherein the program instructions, when executed by the at least one processor, cause the at least one processor to:
determine, based on the user information associated with the first user accessing the meeting via the first meeting application, one or both of i) a geographical location of the first user and ii) a time of day in the geographical location of the first user; and
select the first content of the selected first set of one or more virtual lobby applications based at least in part on the one or both of i) the geographical location of the first user and ii) the time of day in the geographical location of the first user.

3. The system of claim 1, wherein the program instructions, when executed by the at least one processor, cause the at least one processor to:
identify, based on the configuration information associated with the meeting being accessed via the first meeting application, one or more additional virtual lobby applications that are required to be displayed in the virtual lobby of the first meeting application; and
cause the one or more additional virtual lobby applications to be rendered within the virtual lobby display in the user interface of the first meeting application.

4. The system of claim 3, wherein the program instructions, when executed by the at least one processor, cause the at least one processor to, for at least one virtual lobby application among the one or more additional virtual lobby applications, i) obtain, based on information identifying the first user, personalized content to be displayed within the virtual lobby application to the first user, and ii) cause a display of the personalized content to be rendered within the virtual lobby application in the virtual lobby of the first meeting application.

5. The system of claim 3, wherein the program instructions, when executed by the at least one processor, cause the at least one processor to, for at least one virtual lobby application among the one or more additional virtual lobby applications:
obtain, based on information identifying one or more of i) a tenant associated with the meeting, ii) the organizer of the meeting, or iii) a user hosting the meeting, customized content to be displayed within the virtual lobby application; and
cause a display of the customized content to be rendered within the virtual lobby application in the virtual lobby of the first meeting application.

6. The system of claim 1, wherein the program instructions, when executed by the at least one processor, further cause the at least one processor to generate the virtual lobby display at least in part according to a first theme specified in the configuration information associated with the meeting being accessed via the first meeting application.

7. The system of claim 6, wherein the program instructions, when executed by the at least one processor, cause the at least one processor to generate the virtual lobby display further according to a second theme specified in setting information associated with the first user accessing the meeting via the first meeting application.

8. The system of claim 1, wherein the virtual lobby display is accessible by the first user during one or more time periods including one or more of i) before the user is admitted to the meeting in the meeting application, ii) while the user is attending the meeting in the meeting application or iii) after completion of the meeting in the meeting application.

9. The system of claim 1, wherein the program instructions, when executed by the at least one processor, further cause the at least one processor to:
implement a machine learning algorithm configured to rank respective virtual lobby applications in the identified pool of virtual lobby applications based on one or more parameters associated with the first user; and
select one or more highest ranked virtual lobby applications to be included in the first set of one or more virtual lobby applications.

10. The system of claim 1, wherein the first set of one or more virtual lobby applications includes one or more of i) at least one advertisement application and ii) at least one sponsored third party application.

11. The system of claim 1, wherein the program instructions, when executed by the at least one processor, further cause the at least one processor:
receive, from a second user device over the network, user information associated with a second user accessing the meeting via a second meeting application executing on the second device;
select, based at least in part on the user information associated with the second user accessing the meeting via the second meeting application, a second content of the selected first set of virtual lobby applications, for display to the second user in a virtual lobby of the second meeting application, wherein the second content of at least one of the one or more virtual lobby applications selected for the second user is not in the first content of virtual lobby applications selected for the first user; and
cause respective second content of the virtual lobby applications, among the selected first set of virtual lobby applications, to be rendered within a virtual lobby display in a user interface of the second meeting application executing on the second user device.

12. A method for generating personalized virtual lobbies, the method comprising:
identifying, based at least in part on configuration information associated with a meeting being accessed by a plurality of users via respective meeting applications executing on respective user devices, a pool of virtual lobby applications available for display in virtual lobbies of the respective meeting applications, the configuration information configured by one or both of i) an administrator of the meeting and ii) an organizer of the meeting that are not the plurality of users, the administrator of the meeting and organizer of the meeting not being the plurality of users;
selecting, based at least in part on the configuration information, a first set of virtual lobby applications, from among the pool of virtual lobby applications identified based at least in part on the configuration information, for display to the plurality of users in the virtual lobby of the first meeting application;
causing respective virtual lobby applications, among the first set of virtual lobby applications, to be rendered within virtual lobby displays in respective user interfaces of the respective meeting applications executing on respective user devices;
receiving, from at least some of the respective user devices over a network after causing the respective virtual lobby applications to be rendered, user information associated with at least some of the users accessing the meeting via the respective meeting applications;
for one or more users among the plurality of users, selecting, based at least in part on the user information associated with the one or more users, respective first content of the first set of virtual lobby applications, for display to the one or more user; and
causing the respective first content of one or more virtual lobby applications to be rendered in the respective virtual lobby displays in the respective user interfaces of the respective meeting applications executing on the respective user devices.

13. The method of claim 12, wherein selecting a particular set of one or more virtual lobby applications for display to a particular user among the plurality of users comprises selecting the particular set based at least in part on one or both of i) a geographical location of the particular user and ii) the time of day in the geographical location of the particular user.

14. The method of claim 12, further comprising:
identifying, based on the configuration information associated with a meeting being accessed by a plurality of users via respective meeting applications, one or more additional virtual lobby applications that are required to be displayed in the virtual lobbies of the respective meeting applications; and
causing the one or more additional virtual lobby applications to be rendered in each of the respective virtual lobby displays in respective user interfaces of the respective meeting applications.

15. The method of claim 12, further comprising, for at least one virtual lobby application among the one or more additional virtual lobby applications:
obtaining, based on information identifying a particular user among the plurality of users, personalized content to be displayed within the virtual lobby application; and
causing a display of the personalized content to be rendered within the virtual lobby application in a particular virtual lobby display rendered to the particular user in a user interface of a particular meeting application without causing the personalized content to be rendered within the virtual lobby application in another virtual lobby display rendered to another user in a user interface of another meeting application.

16. The method of claim 12, further comprising, for at least one virtual lobby application among the one or more additional virtual lobby applications:
obtaining, based on information identifying one or more of i) a tenant associated with the meeting, ii) the organizer of the meeting, or iii) a user hosting the meeting, shared content to be displayed within the virtual lobby application; and
causing a display of the shared content to be rendered within the virtual lobby application in each respective virtual lobby display in each user interface of each of the respective meeting applications.

17. The method of claim 12, further comprising generating respective virtual lobby displays for the respective users based according to one or both of i) a first theme specified in the configuration information associated with the meeting being accessed by the respective users via the respective meeting applications and ii) particular themes specified in setting information associated with respective users accessing the meeting via the respective meeting applications.

18. A computer storage medium storing computer-executable instructions that when executed by at least one processor cause a computer system to:
 identify, based at least in part on configuration information associated with a meeting being accessed by a user via a meeting application executing on a user device, a pool of virtual lobby applications available for display in a virtual lobby of the meeting application, the configuration information configured by one or both of i) an administrator of the meeting and ii) an organizer of the meeting that are not the user, the administrator of the meeting and organizer of the meeting not being the user;
 select, based at least in part on the configuration information, a first set of virtual lobby applications, from among the pool of virtual lobby applications identified based at least in part on the configuration information, for display to the user in the virtual lobby of the meeting application;
 cause respective virtual lobby applications, among the first set of virtual lobby applications, to be rendered within a virtual lobby display in a user interface of the meeting application executing on the user device;
 receive, from the user device over a network after causing the respective virtual lobby applications to be rendered, user information associated with the user accessing the meeting via the meeting application;
 select, based at least in part on the user information associated with the user accessing the meeting via the meeting application, a first content of the selected first set of virtual lobby applications, for display to the user in the virtual lobby of the meeting application; and
 cause respective first content of the virtual lobby applications, among the set of virtual lobby applications, to be rendered within the virtual lobby display in the user interface of the meeting application executing on the user device.

19. The computer storage medium of claim 18, wherein the instructions, when executed by the at least one processor, further cause the computer system to:
 determine, based on information associated with the user accessing the meeting via the meeting application, one or both of i) a geographical location of the user and ii) a time of day in the geographical location of the user; and
 select the set of one or more virtual lobby applications based at least in part on the one or both of i) the geographical location of the user and ii) the time of day in the geographical location of the user.

20. The computer storage medium of claim 18, wherein the instructions, when executed by the at least one processor, further cause the computer system to
 identify, based on the meeting configuration information, one or more additional virtual lobby applications that are required to be displayed in the virtual lobby of the first meeting application; and
 cause the one or more identified additional virtual lobby applications to be rendered within the virtual lobby display in the user interface of the meeting application.

* * * * *